United States Patent [19]
Takarada et al.

[11] Patent Number: 5,767,219
[45] Date of Patent: Jun. 16, 1998

[54] POLYSILOXANE-POLYETHER BLOCK COPOLYMER AND METHOD FOR THE PRERARATION THEREOF

[75] Inventors: Mitsuhiro Takarada; Masanao Kamei; Hiroshi Sasaki. all of Gunma-ken, Japan

[73] Assignee: Shin-Etsu Chemical Co., Ltd., Tokyo, Japan

[21] Appl. No.: 829,423

[22] Filed: Mar. 31, 1997

[30] Foreign Application Priority Data

Apr. 1, 1996 [JP] Japan .................................. 8-078989

[51] Int. Cl.$^6$ ................................................. C08G 77/08
[52] U.S. Cl. ................... 528/29; 528/31; 528/43; 528/15; 556/445
[58] Field of Search .......................... 528/29, 31, 43, 528/15; 556/445

[56] References Cited

U.S. PATENT DOCUMENTS

| | | | |
|---|---|---|---|
| 3,176,034 | 3/1965 | Clark | 556/445 |
| 3,957,842 | 5/1976 | Prokai et al. | 556/445 |
| 5,032,662 | 7/1991 | Berger et al. | 528/25 |
| 5,542,960 | 8/1996 | Grabowski | 44/320 |

*Primary Examiner*—Margaret W. Glass
*Attorney, Agent, or Firm*—Millen, White, Zelano, & Branigan, P.C.

[57] ABSTRACT

Proposed is a novel polysiloxane-polyether block copolymer having excellent heat resistance, which is characterized by the molecular structure consisting of repetition of diorganopolysiloxane units and polyoxyalkylene units having a bisphenol linkage of the formula —O—Pn—CMe$_2$—Pn—O— in the unit, Pn being a 1,4-phenylene group and Me is a methyl group. This polysiloxane-polyether block copolymer can be prepared by conducting a hydrosilation reaction between a diorganopolysiloxane terminated at each molecular chain end with a silicon-bonded hydrogen atom and a polyoxyalkylene compound having the bisphenol linkage in the molecule and terminated at each molecular chain end with an alkenyl group or, preferably, allyl group in the presence of a platinum catalyst. The stability of the block copolymer obtained by the hydrosilation reaction can be further improved, when the block copolymer has a silicon-bonded hydrogen atom as the terminal group, by reacting the silicon-bonded hydrogen atom with water or alcohol to be converted into a silanolic hydroxy group or alkoxy group.

14 Claims, 6 Drawing Sheets

POLYSILOXANE-POLYETHER BLOCK COPOLYMER AND METHOD FOR THE PRERARATION THEREOF

BACKGROUND OF THE INVENTION

The present invention relates to a novel polysiloxane-polyether block copolymer and a method for the preparation thereof. More particularly, the invention relates to a block copolymer consisting of alternate repetition of organopolysiloxane blocks and polyether blocks and having usefulness as an antistatic agent, mold-release or surface-release agent and lubricant with excellent heat resistance as well as to an efficient method for the preparation of such a block copolymer.

As is well known, diorganopolysiloxane oils or so-calledsilicone oils in general have excellent heat resistance and exhibit good releasability so that they are widely used as a mold release agent on metal molds in the molding process of various kinds of thermoplastic and thermosetting resins and rubbers and as a surface release agent on toner particles used in electrophotographic copying and printing machines. Besides the diorganopolysiloxane oils, e.g., dimethylpolysiloxane oils, amino-modified or polyether-modified diorganopolysiloxanes are widely used in molding compositions based on epoxy resins, polystyrene resins, ABS resins and the like as an additive ingredient such as a stress reducing agent, internal mold release agent, impact strength improver or antistatic agent.

Conventional dimethylpolysiloxane oils mentioned above, however, are not quite satisfactory in respect of their heat resistance. When the oil is used as a mold release agent on metal mold for resin molding, for example, the oil is subject to gradual thermal degradation at a temperature of 150° C. or higher and gelation of the oil takes place at a temperature of 200° C. or higher as is sometimes encountered in the resin molding processes. Dimethylpolysiloxane oils are also not satisfactory as a release agent for toner particles in a high-speed electrophotographic copying machine because the heating roller of the machine is run at a high temperature of 200° C. or higher to cause thermal degradation of the oil so that good reproduction of images can hardly be accomplished.

On the other hand, a trend in recent years in the resin molding technology and electrophotographic copying machines that the working temperature of the metal mold or heating rollers is increased higher and higher in order to improve the productivity of resin molding or to decrease the copying time. Several attempts and proposals have been made for the improvement of silicone oils to be in compliance with the requirement for a higher service temperature as a release agent including an amino group-containing diorganopolysiloxane oil disclosed in Japanese Patent Kokai 3-227206 and mercapto group-containing diorganopolysiloxane oil disclosed in Japanese Patent Kokai 4-320424. The solution of the problems provided by these modified diorganopolysiloxane oils, however, is still far from satisfactory because, in addition to the insufficient improvement in the heat resistance of the oils, these modified diorganopolysiloxane oils are susceptible to emission of an unpleasant odor due to ammonia or mercaptan or discoloration by heating if not to mention that little antistatic effect can be obtained with these oils.

It is also a well established technology that various kinds of resin compositions are admixed with a polyether-modified diorganopolysiloxane or a quaternary ammonium compound with an object to render the resin composition antistatic. Examples of the polyether-modified diorganopolysiloxane include a diorganopolysiloxane having polyoxyalkylene groups as the pendants on the main chain of polysiloxane, a block copolymer consisting of polyoxyalkylene blocks and diorganopolysiloxane blocks as disclosed in Japanese Patent Kokai 4-234307 and complexes of a polyoxyethylene-dimethylpolysiloxane-polyoxyethylene copolymer and an alkali metal salt or alkaline earth metal salt as disclosed in Japanese Patent Kokai 7-247413. Although these polyether-modified dimethylpolysiloxanes are excellent as an antistatic agent, the polyether moiety therein is susceptible to conversion into aldehydes by heating so that their properties required for a release agent are lost at all. Accordingly, they are not quite satisfactory as a release agent or lubricant to be used under high temperature conditions or, in other words, they cannot be used under exposure to a high temperature of 150° C. or higher as is the case in high-temperature molding due to lack in the heat resistance.

SUMMARY OF THE INVENTION

The present invention accordingly has an object to provide a novel silicone-based compound having excellent heat resistance and suitable for use as a release agent, antistatic agent or lubricant to satisfy the requirements for heat resistance as well as to provide an efficient method for the preparation thereof Thus, the silicone-based compound of the invention is a polysiloxane-polyether block copolymer consisting of an alternate repetition of two types of the units including:

(A) a first type block units of polysiloxane moiety represented by the general formula

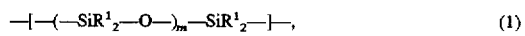 (1)

in which each $R^1$ is, independently from the others, an unsubstituted or substituted monovalent hydrocarbon group having 1 to 8 carbon atoms and the subscript m is a positive integer in the range from 3 to 200, and (B) a second type block units of polyether moiety represented by the general formula

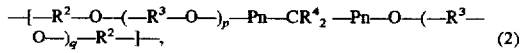 (2)

in which Pn is a 1,4-phenylene group, each $R^2$ is, independently from the other, a divalent hydrocarbon group having 2 to 8 carbon atoms, each $R^3$ is, independently from the others, an ethylene group or propylene group, each $R^4$ is, independently from the other, a hydrogen atom or methyl group and each of the subscripts p and q is a positive integer in the range from 3 to 30.

The above defined polysiloxane-polyether block copolymer can be prepared by a method which comprises the steps of:

(a) mixing an organohydrogenpolysiloxane represented by the general formula

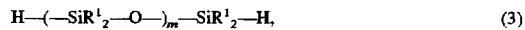 (3)

in which each symbol has the same meaning as defined above, and a polyether compound represented by the general formula

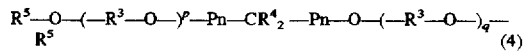 (4)

in which $R^5$ is a monovalent hydrocarbon group having 2 to 8 carbon atoms and having an ethylenically unsaturated linkage, which is preferably an alkenyl group of the general formula —($-CH_2-$)$_n$—$CR=CH_2$, R being a hydrogen atom or a methyl group and n being a positive integer of 1 to 6 or, more preferably, an allyl group, and each of the other symbols has the same meaning as defined above, to form a mixture;

(b) admixing the mixture with a catalytic amount of a platinum compound; and (c) heating the mixture to effect hydrosilation reaction between the silicon-bonded hydrogen atoms at the molecular chain ends of the organohydrogenpolysiloxane and the ethylenically unsaturated linkages in the groups $R^5$ at the molecular chain ends of the polyether compound.

Each of the molecular chain ends of the block copolymer obtained by the above defined method is terminated either with a silicon-bonded hydrogen atom of the organohydrogenpolysiloxane or an alkenyl group $R^5$ of the polyether compound depending on the blending proportion of the organohydrogenpolysiloxane and polyether compound. When the molecular chain end of the block copolymer is terminated by a silicon-bonded hydrogen atom, it is preferable that the block copolymer obtained in step (c) of the above defined method is further reacted with water or an alcohol having 1 to 4 carbon atoms in a molecule to give a terminal-stabilized block copolymer.

DETAILED DESCRIPTION OF THE PREFERRED EMBODIMENTS

Figure 1:
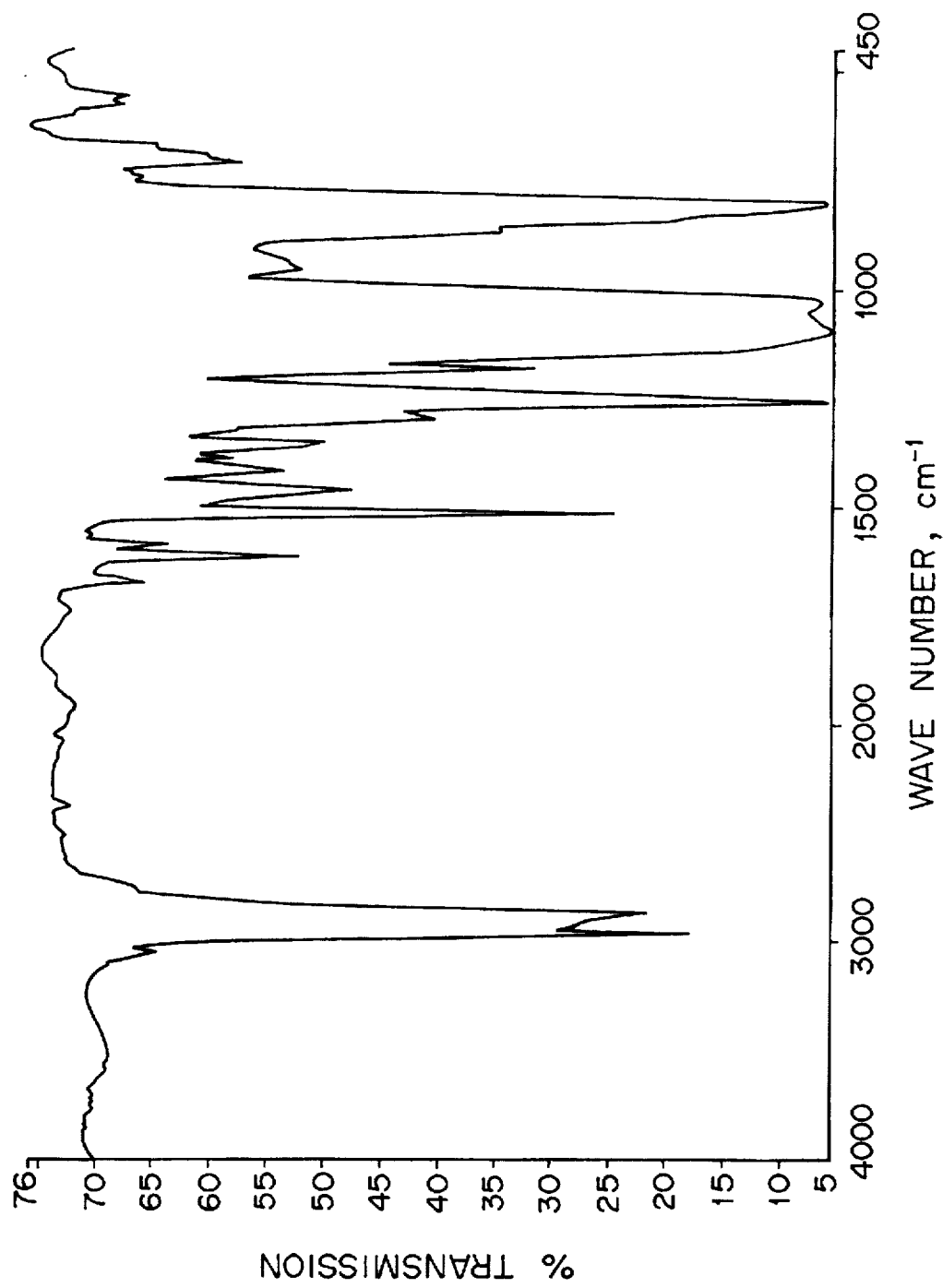
FIGS. 1, 2 and 3 are each an infrared absorption spectrum of the block copolymer obtained in Example 1, Example 2 and Comparative Example, respectively.

The polysiloxane-polyether block copolymer of the present invention has a molecular structure consisting of alternate repetition of the polysiloxane units represented by the above given general formula (1), referred to as the units A hereinafter, and the polyoxyalkylene units represented by the above given general formula (2), referred to as the units B hereinafter. In the general formula (1) representing the unit A, each $R^1$ is, independently from the others, an unsubstituted or substituted monovalent hydrocarbon group free from aliphatic unsaturation and having 1 to 8 carbon atoms, which is exemplified by alkyl groups such as methyl, ethyl, propyl, butyl, hexyl and octyl groups and aryl groups such as phenyl and tolyl groups as well as halogen-substituted alkyl groups such as 3,3,3-trifluoropropyl group, of which methyl and phenyl groups are preferable from the standpoint of industrial preparation of the block copolymer. When excellent mold releasability and lubricity are desired for the block copolymer, in particular, it is preferable that all of or at least 50% by moles of the groups denoted by $R^1$ are methyl groups. The subscript m in the general formula (1) is a positive integer, by which the chain length of the unit A is defined, in the range from 3 to 200 or, preferably, from 5 to 100. When the value of m is too small, the block copolymer cannot be imparted with high heat resistance while, when the value of m is too large, the block copolymer has an increased viscosity to cause a disadvantage in the applications in which fluidity of the block copolymer is desirable.

The polyoxyalkylene unit, i.e. unit B, is represented by the general formula (2) given above, in which Pn is a 1,4-phenylene group, $R^4$ is a hydrogen atom or a methyl group and each $R^2$ is, independently from the others, a divalent hydrocarbon group or, preferably, alkylene group having 2 to 8 carbon atoms exemplified by ethylene, propylene, butylene, hexamethylene, octamethylene and isobutylene groups, of which particularly preferable are an n-propylene group of the formula —$CH_2CH_2CH_2$—, isobutylene group of the formula —$CH_2CH(CH_3)CH_2$— and 2-methylbutylene group of the formula —$CH_2CH(CH_3)CH_2CH_2$—. Each $R^3$ in the general formula (2) is, independently from the others, an ethylene group —$CH_2CH_2$— or propylene group —$CH_2CH(CH_3)$— either singly or as a combination of both so that the polyether linkage has a structure of polyoxyethylene, polyoxypropylene or poly(oxyethylene-oxypropylene). Each of the subscripts p and q, which defines the number of repetition of the oxyalkylene linkages, is a positive integer in the range from 3 to 30 or, preferably, from 5 to 20. When the values of p and q do not fall within this range, the block copolymer would not be suitable for certain applications. For example, no sufficiently high antistatic effect can be obtained when the values of p and/or q are too small while the block copolymer cannot be highly heat resistant when the values are too large.

Since the polysiloxane-polyether block copolymer of the present invention is formed by an alternate repetition of the units A and units B, each of the molecular chain ends can be terminated either with the unit A or with the unit B so that the block copolymer can be represented by the formula $(AB)_r$, $A(BA)_t$ or $B(AB)_r$. When the molar proportion of the starting organohydrogenpolysiloxane and the polyether compound is equimolar, the resultant block copolymer has a structure of (AB)t while the structure is $A(BA)_t$ or $B(AB)_t$ when the molar amount of the organohydrogenpolysiloxane is larger or smaller, respectively, than the polyether compound. The subscript t is the number of alternation of the units A and B, preferably, in the range from 1 to 20. The value of t can be adequately controlled by interrupting proceeding of the hydrosilation reaction at an appropriate stage although the reaction cannot proceed too far due to the limitation in the reaction rate and steric hindrance. When the value of t is too large, the block copolymer has an increased viscosity to cause a disadvantage of decreased workability in the applications in which fluidity of the block copolymer is desirable. The terminal group at each of the molecular chain ends of the block copolymer can be a hydrogen atom, hydroxy group, alkoxy group having 1 to 4 carbon atoms, monovalent hydrocarbon group having 1 to 8 carbon atoms, optionally, having an aliphatic unsaturation or trialkylsiloxy group without particular limitations.

The above defined polysiloxane-polyether block copolymer of the invention can be prepared by subjecting an organohydrogenpolysiloxane represented by the above given general formula (3) and a polyether compound represented by the above given general formula (4) to the hydrosilation reaction in the presence of a catalytic amount of a platinum compound as the catalyst.

The hydrosilation reaction can proceed either in the absence or in the presence of an organic solvent. It is, however, advantageous, when the polyether compound has a high viscosity or is a solid, to use an organic solvent including aromatic hydrocarbon solvents and ether solvents such as toluene, xylene, tetrahydrofuran, diethyl ether, dibutyl ether and the like, in which the organohydrogenpolysiloxane and the polyether compound are dissolved together with the platinum catalyst. Suitable platinum compounds include those in which the platinum atom is in the state of zero-valency or tetravalency exemplified by chloroplatinic acid and complexes thereof with a vinyl compound. The amount of the platinum compound as the catalyst for the hydrosilation reaction is in the range from 2 to 1000 ppm by weight or, preferably, from 5 to 200 ppm by weight relative to the amount of the organohydrogenpolysiloxane of the general formula (3) as calculated for the platinum atoms. Although the hydrosilation reaction can proceed at a temperature in the range from room temperature to 150° C., it is preferable that the reaction mixture is heated at a temperature in the range from 50 to 120° C. so that the reaction is complete usually within 2 to 24 hours with termination of viscosity increase of the reaction mixture.

The molecular chain end of the block copolymer after completion of the above mentioned hydrosilation reaction is terminated with a silicon-bonded hydrogen atom, i.e. hydrosilyl group, derived from the organohydrogenpolysiloxane or an alkenyl group derived from the alkenyl-terminated polyether compound depending on the blending proportion of the two reactants. When the block copolymer has a silicon-bonded hydrogen atom at the molecular chain end as is the case when the block copolymer formed by the hydrosilation reaction has a structure of $(AB)_t$ or $A(BA)_t$ mentioned before, it is advantageous from the standpoint of stability of the block copolymer that the silicon-bonded hydrogen atom is converted into a silanolic hydroxy group, trimethylsiloxy group or alkoxy group by the reaction with water or an alcohol having 1 to 4 carbon atoms in a molecule such as methyl, ethyl and isopropyl alcohols. The molar amount of water or lower alcohol to be added to the reaction mixture is at least a half of the silicon-bonded hydrogen atoms in the block copolymer. This stabilization treatment is performed by admixing the reaction mixture after completion of the hydrosilation reaction with an appropriate amount of water or alcohol and heating the mixture at 50 to 150° C. for 1 to 6 hours so that the hydrosilyl groups are dehydrogenated by the activity of the remaining platinum catalyst in the reaction mixture and converted into a silanol group or alkoxysilyl group by reacting with water or alcohol. As is well known, the silanolic hydroxy group can be converted into a trimethylsiloxy group by the trimethylsilylation reaction with hexamethyldisilazane or trimethyl chlorosilane with an object to further increase stability of the block copolymer.

The organohydrogenpolysiloxane as one of the reactants in the hydrosilation reaction and represented by the general formula (3) is exemplified by those expressed by the following formulas, though not particularly limitative thereto:

H—(—SiMe$_2$—O—)$_9$—SiMe$_2$—H;
H—(—SiMe$_2$—O—)$_{19}$—SiMe$_2$—H;
H—(—SiMe$_2$—O—)$_{39}$—SiMe$_2$—H;
H—(—SiMe$_2$—O—)$_7$—(—SiPh$_2$—O—)$_2$—SiMe$_2$—H;
H—(—SiMe$_2$—O—)$_7$—(—SiMePh—O—)$_2$—SiMe$_2$—H;
H—(—SiMe$_2$—O—)$_{15}$—(—SiPh$_2$—O—)$_4$—SiMe$_2$—H;
H—(—SiMe$_2$—O—)$_{15}$—(—SiMePh—O—)$_4$—SiMe$_2$—H;
H—(—SiMe$_2$—O—)$_{59}$—SiMe$_2$—H; and
H—SiMe$_2$—O—(—SiMePh—O—)$_{18}$—SiMe$_2$—H, in which Me and Ph denote a methyl group and a phenyl group, respectively. These organohydrogenpolysiloxanes can be prepared by a known method such as an acid-catalyzed siloxane rearrangement equilibration reaction between 1,1,3,3-tetramethyldisiloxane and a cyclic dimethyl-, diphenyl- or methylphenylpolysiloxane oligomer.

The polyether compound as the other reactant and represented by the general formula (4) given above can be obtained by the alkenylation reaction of an alcoholic hydroxy-terminated polyether compound derived from bisphenol A as a commercial product such as Uniol polyethers sold by Nippon Oils and Fats Co. and those sold by Sanyo Chemical Industries, Ltd. as an addition product of bisphenol A and a polyoxyalkylene. Alkenyl-terminated polyethers are available on the market and can be used as such including Uniox DAA-780 sold by Nippon Oils and Fats Co. and DABP polyethers sold by Sanyo Chemical Industries, Ltd. though not particularly limitative thereto.

The polyether compound suitable as the reactant in the hydrosilation reaction is exemplified by those expressed by the following formulas:

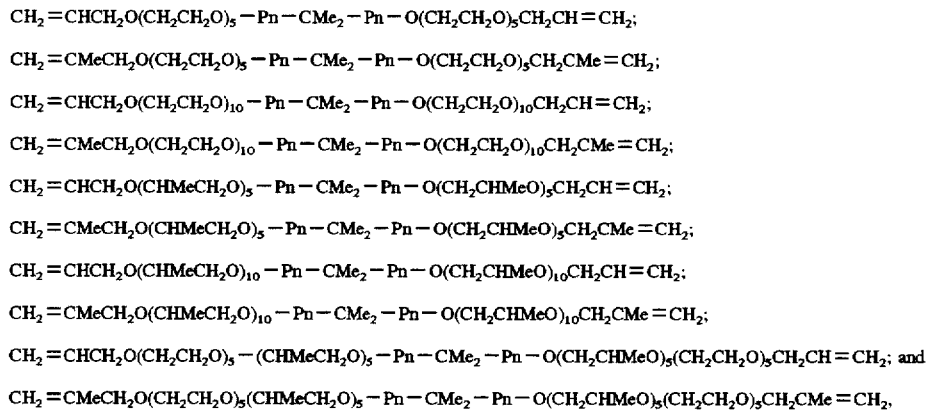

in which Pn is a 1,4-phenylene group and Me is a methyl group.

The polysiloxane-polyether block copolymer of the present invention obtained in the above described manner is usually a fluid having a viscosity in the range from 50 to 1,000,000 centistokes at 25° C. or in the form of solid at room temperature. Though dependent on the particularly intended application, it is advantageous that the block copolymer has a viscosity in the range from 100 to 50,000 centistokes at 25° C. for most applications in respect of workability.

The polysiloxane-polyether block copolymer of the invention has remarkably high heat resistance as compared with conventional polyether-modified organopolysiloxanes in which the polyoxyalkylene groups are bonded to the siloxane units as a pendant group thereon as is represented, for example, by the general formula:

Me₃SiO(SiMe₂O)w(SiMeGO)xSiMe₃, in which Me is a methyl group, G is a polyoxyalkylene group of the formula —CH₂CH₂CH₂O(C₂H₄O)ᵧH, y being a positive integer of 1 to 30, and the subscripts w and x are each a positive integer of 1 to 500 and 1 to 50, respectively. This remarkably high heat resistance of the block copolymer is presumably due to the facts that the terminal of the polyoxyalkylene unit is blocked with a siloxane unit and the polyoxyalkylene unit has a structure of bisphenol A known to be thermally stable. By virtue of the polyoxyalkylene moiety contained therein, the block copolymer of the invention has good compatibility with various kinds of other resinous materials and has a low volume resistivity to have usefulness as an antistatic agent.

Having the above mentioned unique properties, the block copolymer of the present invention is useful in a variety of applications including mold release agents on a metal mold for molding of synthetic resins and rubbers, release agents for toner particles in electrophotographic copying machines, oiling agents of synthetic fibers such as oiling agents for base fibers, fibers for false twisting, base carbon fibers and tire cord filaments, antistatic agents for various kinds of fabric materials, impact strength improvers and mold-release additives in thermoplastic resin based molding compositions, stress reducing agents in epoxy resin-based molding compositions, lubricants in polishing waxes, heating media and so on.

Moreover, the polysiloxane-polyether block copolymer of the invention has excellent heat resistance without suffering discoloration and changes in the volume resistivity even after prolonged heating in air so that the block copolymer is particularly useful as a release agent in copying machines operated at high temperatures and an additive such as mold release agent or antistatic agent in molding compositions based on a thermoplastic resin which must be processed at a high temperature such as polyethylene terephthalate, polyphenylene oxide, polycarbonate and the like. This feature is particularly advantageous as compared with conventional organopolysiloxane oils for high temperature use which are inherently colored or subject to discoloration within a short time at high temperatures as a consequence of admixture of heat resistance improvers such as amine compounds, phenolic compounds, iron-containing compounds, cerium-containing compounds and the like.

In the following, the polysiloxane-polyether block copolymer of the present invention and the method for the preparation thereof are described in more detail by way of Examples, in which the term of "parts" always refers to "parts by weight".

Example 1.

A reaction mixture was prepared in a flask by introducing 78.8 parts of a dimethyl hydrogenpolysiloxane expressed by the formula

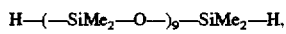

in which Me is a methyl group, and 90 parts of an allyl-terminated polyoxyethylene (Uniox DAA-780, supra) expressed by the formula

in which Pn is a 1,4-phenylene group, together with 0.1 part of a platinum catalyst containing 0.5% by weight of platinum (PL-50T, a product by Shin-Etsu Chemical Co.) and the mixture was heated at 80° C. for 5 hours under agitation to effect the hydrosilation reaction. When no further increase was noted in the reaction mixture after the end of this reaction time indicating completion of the hydrosilation reaction, the reaction mixture in the flask was admixed with 10 parts of water and further agitated at 80° C. for 2 hours followed by removal of water by heating the mixture at 110° C. for 2 hours under a reduced pressure of 5 mmHg.

The thus obtained product, which was a clear and colorless oily liquid and is referred to as the block copolymer 1 hereinafter, had properties including a viscosity of 9500 centistokes at 25° C., refractive index of 1.457 at 25° C., volume resistivity of $8 \times 1010^{10}$ ohm-cm at 25° C. and weight-average molecular weight of 17,000 as determined by the gel permeation chromatographic method making reference to known polystyrene samples. FIG. 1 of the accompanying drawing shows the infrared absorption spectrum of the block copolymer 1.

The block copolymer 1 could be assumed to have a block-wise structure consisting of t times repetition of the units of the formula

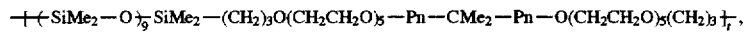

in which the subscript t had an average value of approximately 12.

Figure 4:
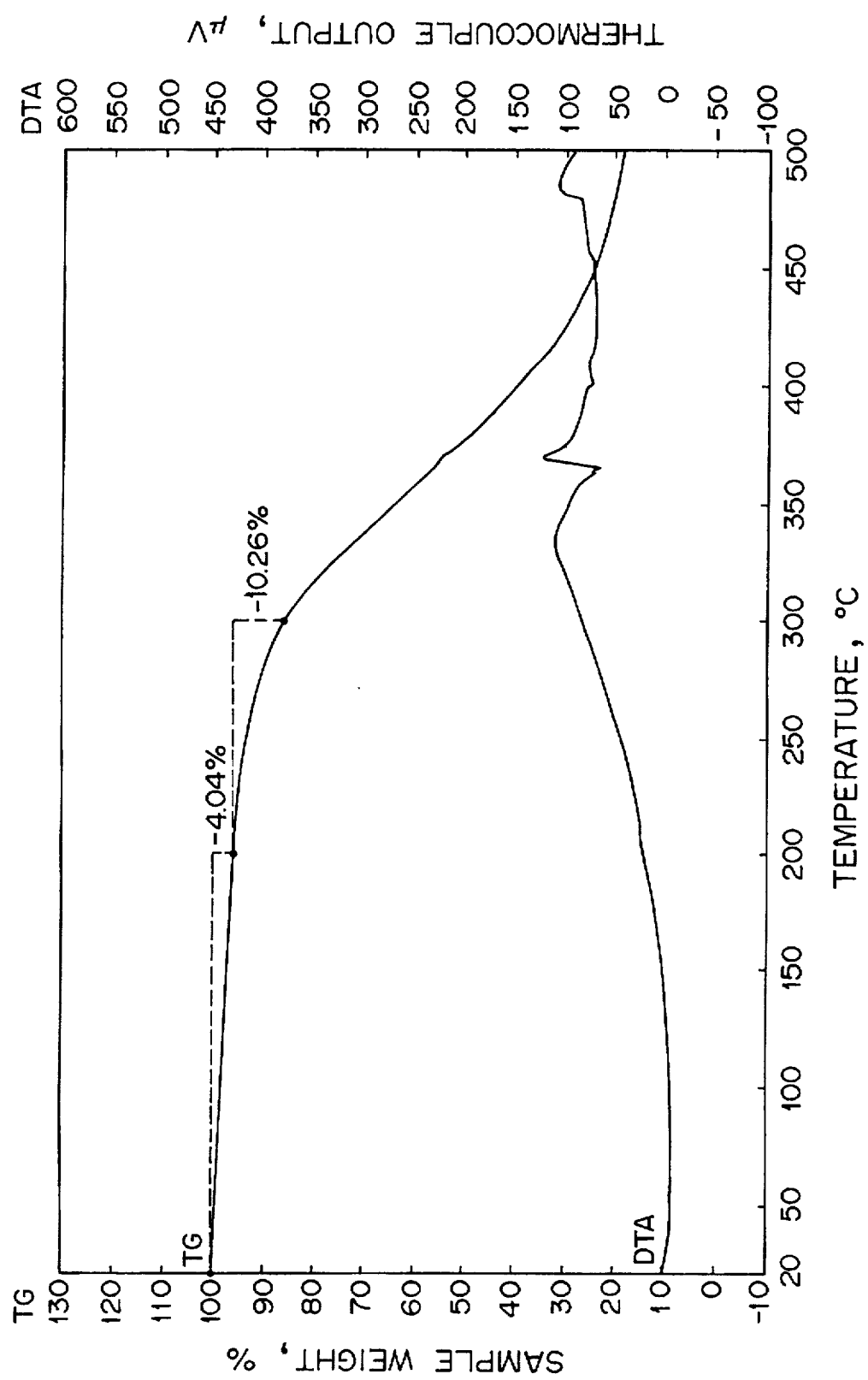
FIGS. 4, 5 and 6 are each a TG-DTA diagram of the block copolymer obtained in Example 1, Example 2 and Comparative Example, respectively.

With an object to test the heat resistance, the block copolymer 1 was heated in air at 200° C. for 100 hours so that the oil turned slightly yellowish and the viscosity thereof was decreased to 11,000 centistokes at 25° C. with a weight loss of 19.6%. FIG. 4 is a diagram obtained by TG-DTA (thermogravimetric-differential thermal analysis) undertaken in air at a rate of temperature elevation of 10° C. per minute.

Example 2.

The procedure for the preparation of a block copolymer, referred to as the block copolymer 2 hereinafter, was substantially the same as in Example 1 for the preparation of the block copolymer 1 except that the reaction mixture for the hydrosilation reaction was prepared from 132 parts of a dimethyl hydrogenpolysiloxane expressed by the formula

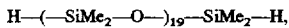

in which Me is a methyl group, 75 parts of the same allyl-terminated polyoxyethylene as used in Example 1 and 0.1 part of the same platinum catalyst.

Figure 2:
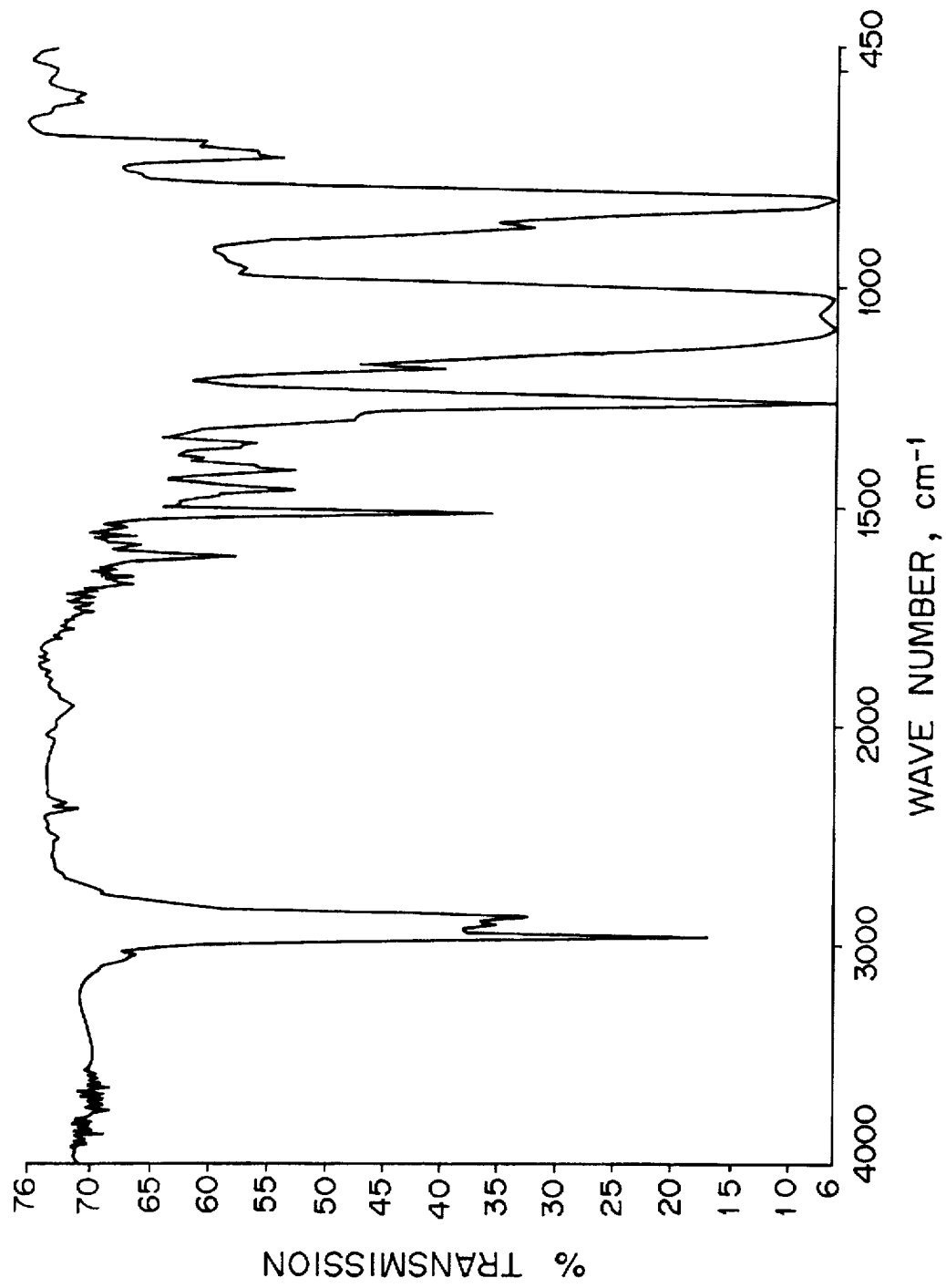

The thus obtained product was a clear and colorless oily liquid and had properties including a viscosity of 16,000 centistokes at 25° C., refractive index of 1.445 at 25° C., volume resistivity of $2 \times 10^{11}$ ohm-cm at 25° C. and weight-average molecular weight of 24,000 as determined by the gel permeation chromatographic method. FIG. 2 of the accompanying drawing shows the infrared absorption spectrum of the block copolymer 2.

The block copolymer 2 could be assumed to have a block-wise structure consisting of t times repetition of the units of the formula

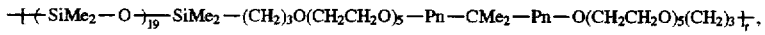

in which the subscript t had an average value of approximately 10.5.

Figure 5:
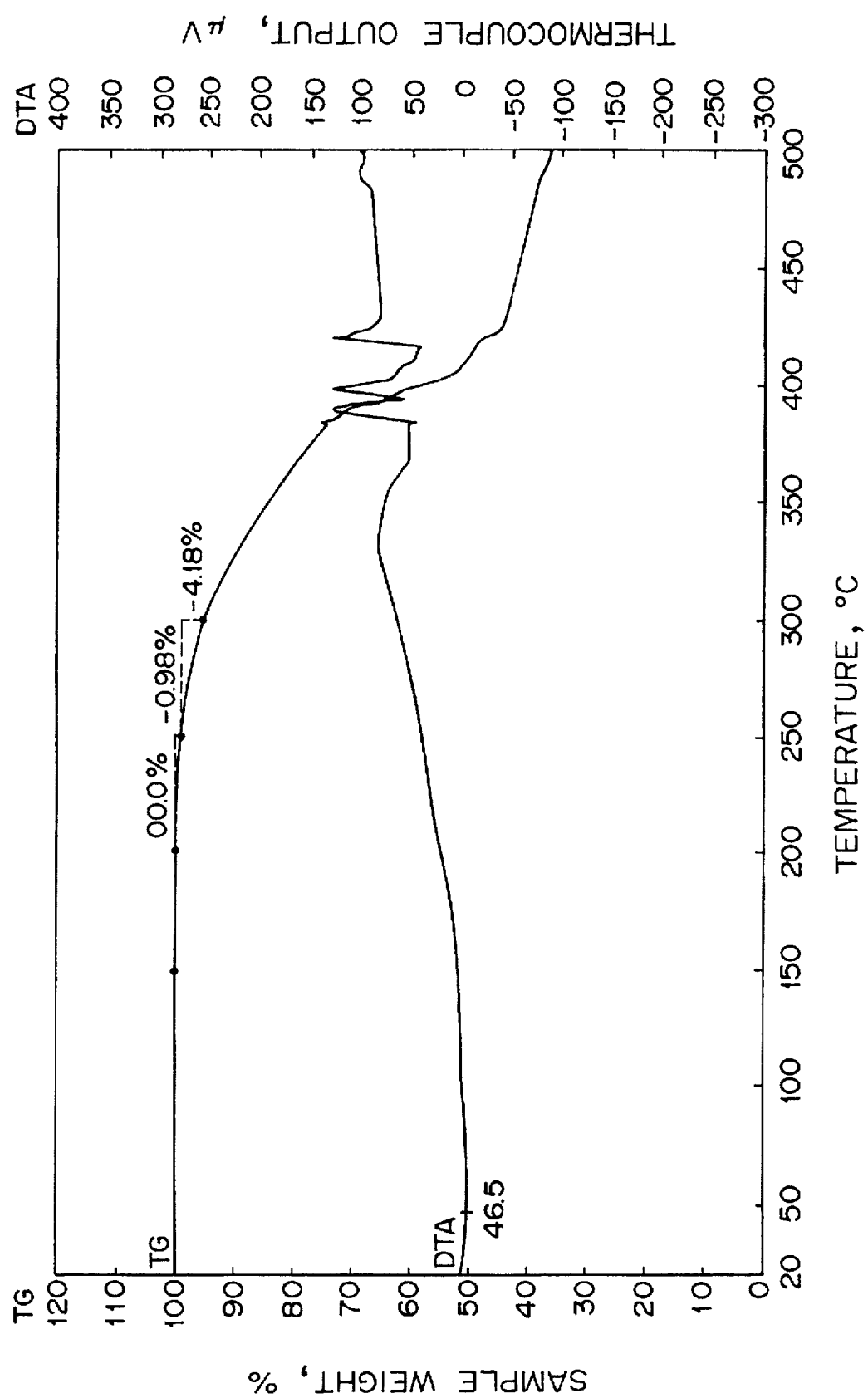

The block copolymer 2 was heated in air at 200° C. for 100 hours so that the oil turned slightly yellowish and the viscosity thereof was decreased to 14,000 centistokes at 25° C. with a weight loss of 10.2%. FIG. 5 is a diagram obtained by TG-DTA undertaken under the same conditions as in Example 1.

Example 3.

The procedure for the preparation of a block copolymer, referred to as the block copolymer 3 hereinafter, was substantially the same as in Example 1 for the preparation of the block copolymer 1 except that the reaction mixture for the hydrosilation reaction was prepared from 70 parts of the same dimethyl hydrogenpolysiloxane as used in Example 2, 60 parts of a second allyl-terminated polyoxyethylene expressed by the formula $$CH_2=CHCH_2O(CH_2CH_2O)_{10}-Pn-CMe_2-Pn-O(CH_2CH_2O)_{10}CH_2CH=CH_2,$$

and 0.1 part of the same platinum catalyst.

The thus obtained product was a clear and colorless oily liquid and had properties including a viscosity of 19,000 centistokes at 25° C., refractive index of 1.450 at 25° C., volume resistivity of $3\times10^{10}$ ohm·cm at 25° C. and weight-average molecular weight of 28,000 as determined by the gel permeation chromatographic method.

The block copolymer 3 could be assumed to have a block-wise structure consisting of t times repetition of the units of the formula

in which the subscript t had an average value of approximately 10.4.

The block copolymer 3 was heated in air at 200° C. for 100 hours so that the oil turned slightly yellowish and the viscosity thereof was decreased to 17,000 centistokes at 25° C. with a weight loss of 9.5%.

Comparative Example.

The procedure for the preparation of a block copolymer, referred to as the block copolymer 4 hereinafter, was substantially the same as in Example 1 for the preparation of the block copolymer 1 except that the reaction mixture for the hydrosilation reaction was prepared from 131 parts of the same dimethyl hydrogenpolysiloxane as used in Example 1, 100 parts of a polyether compound expressed by the average formula $$CH_2=CHCH_2O(CH_2CH_2O)_{97}CH_2CH=CH_2$$

(Uniox AA-480R, a product by Nippon Oils and Fats Co.) and 0.1 part of the same platinum catalyst.

Figure 3:
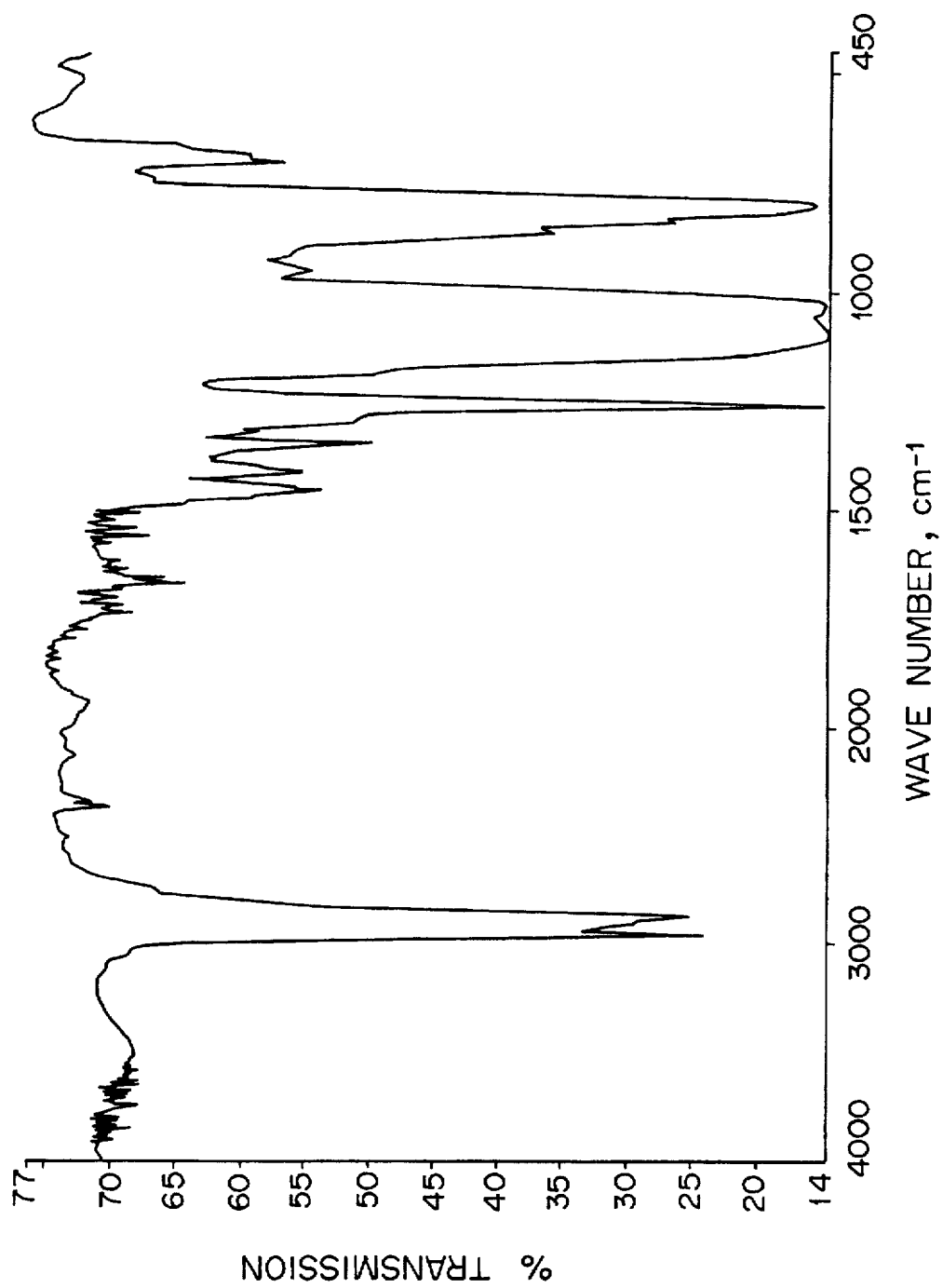

The thus obtained product was a clear and colorless oily liquid and had properties including a viscosity of 600 centistokes at 25° C., refractive index of 1.436 at 25° C., volume resistivity of $4\times10^{11}$ ohm×cm at 25° C. and weight-average molecular weight of 16,000 as determined by the gel permeation chromatographic method. FIG. 3 of the accompanying drawing shows the infrared absorption spectrum of the block copolymer 4.

The block copolymer 4 could be assumed to have a block-wise structure consisting of t times repetition of the units of the formula

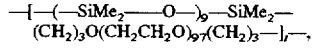

in which the subscript t had an average value of approximately 13.3.

Figure 6:
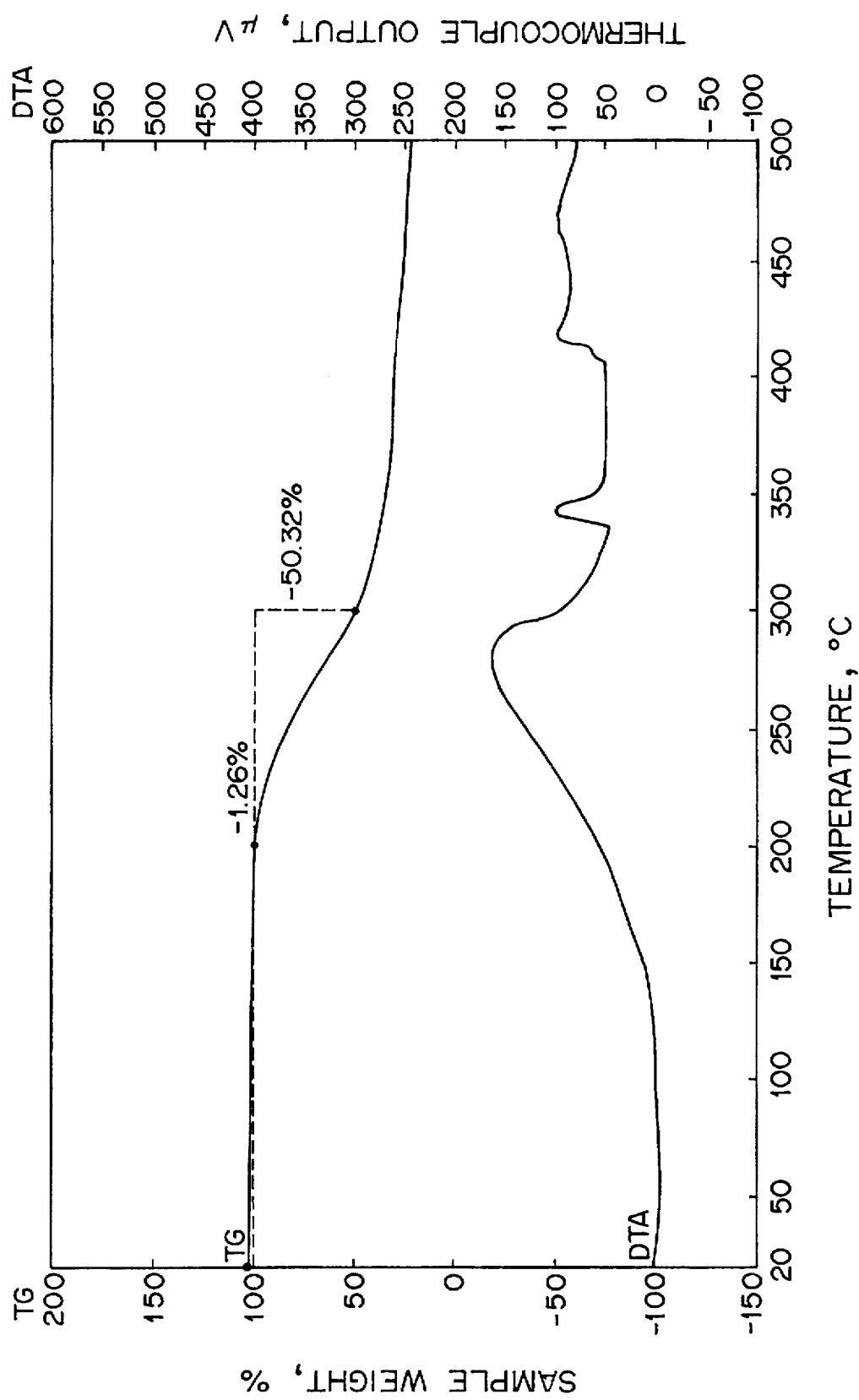

The block copolymer 4 was found to be completely gelled when it was heated in air at 200° C. for 100 hours. FIG. 6 is a diagram obtained by TG-DTA undertaken under the same conditions as in Example 1.

What is claimed is:

1. A polysiloxane-polyether block copolymer having an alternate repetition of the units:

(A) a first type block units of polysiloxane moiety represented by the general formula

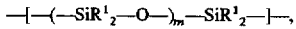

in which each $R^1$ is, independently from the others, an unsubstituted or halogen substituted monovalent hydrocarbon group having 1 to 8 carbon atoms and the subscript m is a positive integer in the range from 3 to 200, and (B) a second type block units of polyether moiety represented by the general formula

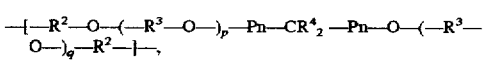

in which Pn is a 1,4-phenylene group, each $R^2$ is, independently from the other, a divalent hydrocarbon group having 2 to 8 carbon atoms, each $R^3$ is, independently from the others, an ethylene group or propylene group, each $R^4$ is, independently from the other, a hydrogen atom or methyl group and each of the subscripts p and q is a positive integer in the range from 3 to 30.

2. The polysiloxane-polyether block copolymer as claimed in claim 1 in which the group denoted by $R^1$ is selected from the group consisting of alkyl groups and aryl groups.

3. The polysiloxane-polyether block copolymer as claimed in claim 2 in which the group denoted by $R^1$ is a methyl group.

4. The polysiloxane-polyether block copolymer as claimed in claim 1 in which the subscript m is a positive integer in the range from 5 to 100.

5. The polysiloxane-polyether block copolymer as claimed in claim 1 in which each of the subscripts p and q is a positive integer in the range from 5 to 20.

6. The polysiloxane-polyether block copolymer as claimed in claim 1 in which the group denoted by $R^2$ is selected from the group consisting of propylene group, isobutylene group and 2-methylbutylene group.

7. A method for the preparation of a polysiloxane-polyether block copolymer of claim 1 which comprises the steps of:

(a) mixing an organohydrogenpolysiloxane represented by the general formula

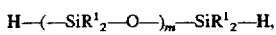

in which each $R^1$ is, independently from the others, an unsubstituted or halogen substituted monovalent hydrocarbon group having 1 to 8 carbon atoms and the subscript m is a positive integer in the range from 3 to 200, and a polyether compound represented by the general formula

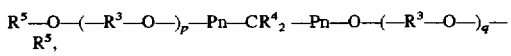

in which Pn is a 1,4-phenylene group, each $R^3$ is, independently from the others, an ethylene group or propylene group, each $R^4$ is, independently from the other, a hydrogen atom or methyl group, each $R^5$ is a monovalent hydrocarbon group having 2 to 8 carbon atoms and having an ethylenically unsaturated linkage and each of the subscripts p and q is a positive integer in the range from 3 to 30 to form a mixture;

(b) admixing the mixture with a catalytic amount of a platinum compound; and (c) heating the mixture to effect hydrosilation reaction between the silicon-bonded hydrogen atoms at the molecular chain ends of the organohydrogenpolysiloxane and the ethylenically unsaturated linkages in the groups $R^5$ at the molecular chain ends of the polyether compound.

8. The method for the preparation of a polysiloxane-polyether block copolymer as claimed in claim 7 in which the group denoted by $R^5$ is an allyl group.

9. The method for the preparation of a polysiloxane-polyether block copolymer as claimed in claim 7 in which the platinum compound is chloroplatinic acid or a complex thereof with a vinyl compound.

10. The method for the preparation of a polysiloxane-polyether block copolymer as claimed in claim 7 in which the amount of the platinum compound is in the range from 2 to 1000 ppm by weight as platinum based on the amount of the organohydrogenpolysiloxane.

11. The method for the preparation of a polysiloxane-polyether block copolymer as claimed in claim 7 in which the organohydrogenpolysiloxane and the polyether compound are mixed in a substantially equimolar proportion.

12. The method for the preparation of a polysiloxane-polyether block copolymer as claimed in claim 7 in which the mixture of the organohydrogenpolysiloxane and the polyether compound is heated in step (c) at a temperature in the range from 50° to 120° C.

13. A method for the preparation of a terminal-stabilized polysiloxane-polyether block copolymer of claim 1 which comprises the steps of:

(a) mixing an organohydrogenpolysiloxane represented by the general formula

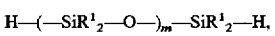

in which each $R^1$ is, independently from the others, an unsubstituted or halogen substituted monovalent hydrocarbon group having 1 to 8 carbon atoms and the subscript m is a positive integer in the range from 3 to 200, and a polyether compound represented by the general formula

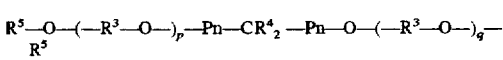

in which Pn is a 1,4-phenylene group, each $R^3$ is, independently from the others, an ethylene group or propylene group, each $R^4$ is, independently from the other, a hydrogen atom or methyl group, each $R^5$ is a monovalent hydrocarbon group having 2 to 8 carbon atoms and having an ethylenically unsaturated linkage and each of the subscripts p and q is a positive integer in the range from 3 to 30 to form a mixture;

(b) admixing the mixture with a catalytic amount of a platinum compound;

(c) heating the mixture to effect hydrosilation reaction between the silicon-bonded hydrogen atoms at the molecular chain ends of the organohydrogenpolysiloxane and the ethylenically unsaturated linkages in the groups $R^5$ at the molecular chain ends of the polyether compound forming a polysiloxane-polyether block copolymer having at least one silicon-bonded hydrogen atom at the molecular chain end;

(d) admixing the reaction mixture after step (c) with water or an alcohol having 1 to 4 carbon atoms in a molecule; and (e) heating the mixture at a temperature in the range from 50° to 150° C. for 1 to 6 hours to covert the silicon-bonded hydrogen atom at the molecular chain end into a hydroxy group or alkoxy group.

14. The method for the preparation of a terminal-stabilized polysiloxane-polyether block copolymer as claimed in claim 13 in which the amount of water or an alcohol added to the reaction mixture after step (c) is at least a half mole per mole of the silicon-bonded hydrogen atoms at the molecular chain ends of the block copolymer obtained in step (c).

* * * * *